Patented Jan. 26, 1943

2,309,365

UNITED STATES PATENT OFFICE 2,309,365

PROCESS FOR PREPARING A REAGENT FOR THE TREATMENT OF LIQUIDS

Oliver M. Urbain, Columbus, Ohio, assignor to Charles H. Lewis, Harpster, Ohio

No Drawing. Original application May 5, 1938, Serial No. 206,281. Divided and this application July 13, 1940, Serial No. 345,430

1 Claim. (Cl. 252—179)

This invention relates to novel materials for the treatment of potable and polluted liquids. Specifically, this invention contemplates materials for the treatment of such liquids comprising reagents produced by the treatment of asphaltic materials with sulfuric acid at low temperatures.

It is an object of this invention to provide materials which are effective in the removal of tastes, odors and colors from liquids. It is a further object of this invention to provide materials with which there may be effected cation or base exchange. Additionally, an object of this invention is to provide materials which may be employed for the purification of sewage and industrial wastes.

The materials prepared in accordance with this disclosure are specifically adapted to the removal of hardness from waters and the removal of tastes, odors and colors, particularly those resulting from organic compounds in true solution, from liquids.

The term "potable water" is intended to apply to water adapted for domestic consumption by the inhabitants of a community. The term "polluted water" is intended to embrace sewage and industrial wastes which possess a detrimental biochemical oxygen demand, B. O. D., due to the presence of organic compounds therein.

In the purification of potable waters, three factors are of primary importance; namely, first, sanitary quality; second, absence of tastes and odors; and, third, hardness.

In the purification of polluted waters, certain additional requirements are present. It is necessary to effect removal of organic compounds present in true solution in the water, particularly where such compounds impart an unsightly color to the water. Dyes fall in the latter category.

I have found that certain novel materials, hereinafter referred to as "sulfated asphaltic materials," prepared in accordance with the following description, may be utilized to free potable and polluted waters of their hardness due to calcium and magnesium salts and to remove the tastes, odors and colors of such waters, due to organic compounds present in true solutions, as well as to improve the sanitary quality thereof.

I have found that certain solid and semi-solid bitumens and pyrobitumens, which I term asphaltic materials, when treated with sulfuric acid at approximately room temperature, yield water insoluble sulfonation products which are characterized in that they possess remarkable cation exchange properties as well as the properties of removing tastes, odors and colors from water.

By the term asphaltic material is meant those bituminous substances termed asphalts, asphaltites, and asphaltic pyrobitumens. The term "asphalts" includes a species of bitumen and also certain pyrogenous substances, of dark color, variable hardness, comparatively non-volatile; composed principally of hydrocarbons, substantially free from oxygenated bodies; containing relatively little to no crystallizable paraffins; sometimes associated with mineral matter, the non-mineral constituents being fusible, and largely soluble in carbon disulfide yielding water insoluble sulfonation products. The term "asphaltites" includes that species of bitumens having similar properties to the asphalts except that the non-mineral constituents are difficultly fusible. The term "asphaltic pyrobitumens" refers to those substances which when subjected to heat or fire will generate, or become transformed into bodies resembling bitumens, and which are dark colored, comparatively hard and non-volatile solids; composed of hydrocarbons, substantially free from oxygenated bodies; sometimes associated with mineral matter, the non-mineral constituents being infusible and largely insoluble in carbon disulfide.

It will be seen that common characteristics of the class of bituminous substances which I term asphaltic materials are their semi-solid to solid consistency and their substantial freedom from contained oxygenated bodies. Included among the materials embraced by this term are the native asphalts such as those occurring naturally in a pure or fairly pure state and those associated naturally with a substantial proportion of mineral matter, the pyrogenous asphalts such as residues obtained from distillation, blowing, etc., of petroleum and the pyrogenous treatment of wurtzilite; the asphaltites such as gilsonite, glance pitch, and grahamite; and the asphaltic pyrobitumens such as elaterite, wurtzilite, albertite, impsonite, and the asphaltic pyrobituminous shales. All of these materials, when treated with sulfuric acid in accordance with the procedure to be described hereinbelow, yield materials which are effective for the treatment of liquids in accordance with my process. Such materials are embraced by the hereinafter employed term sulfated asphaltic materials.

This class of bituminous substances is clearly distinguishable from other bituminous substances such as the non-asphaltic pyrobitumens, which contain oxygenated bodies, and the petroleums which are of liquid consistency. The asphaltic materials are also clearly distinguishable from bituminous tars and pitches, both of which yield water soluble sulfonation products and which are of liquid to viscous consistency and of variable composition.

The sulfonation products obtained from the bituminous substances embraced by the term asphaltic materials, as herein defined, have been found to possess much higher purification and cation exchange properties than other sulfated bituminous materials. It is believed that this is due to the fact that these materials are substantially free from oxygenated bodies, of semi-solid and solid consistency and relatively non-volatile.

In the preparation of these new liquid purification reagents, asphaltic materials, as hereinabove defined, are treated with commercial sulfuric acid. The materials are first granulated to produce a relatively fine powder which will range from approximately 10 to 50 mesh. The granulated materials are then slowly added to concentrated sulfuric acid with constant agitation. The sulfuric acid is always employed in substantial excess of the demand by the asphaltic materials. It is important that no extraneous heat be applied during the sulfuric acid treatment of the asphaltic materials and it is important that the temperature of the reaction be controlled to prevent the reaction rising much in excess of 10 to 15 degrees, though during the acid treating step, the temperature of the mass will rise somewhat. As the acid reacts with the asphaltic materials, a curd is formed. The reaction is completed in approximately one hour, after which the curd is removed and thoroughly washed with water. It can then be broken up and further washed with water until completely free of acid. It may then be dried at a temperature of about 105° C. and is then ready for use. The sulfuric acid employed and remaining after the removal of the curd may be again used for the preparation of new sulfated asphaltic material.

This treatment results in the production of a product, the weight of which is from 50 to 75% greater than the weight of the original asphaltic material employed. The volume of the finished product is from three to four times that of the original asphaltic material. It is believed that the tremendous increase in volume imparts to the finished product a remarkable capacity for the removal of tastes, odors and colors, as well as for the exchange of cations. The finished product will be found to possess excellent physical structure having, when viewed under a microscope, the appearance of large spongy granules.

I regard the avoidance of the employment of heat as a critical factor since I have found that where sulfating of the asphaltic materials is effected at temperatures of the order of the fusing point, or 175° C., the resulting material is as much as 75 to 80% less efficient than are the sulfated asphaltic materials prepared at approximately room temperature. It is my belief that the naturally occurring volatile constituents in the asphaltic materials are responsible for the efficient water purification properties of such asphaltic materials, when sulfated, and care should be taken to retain these constituents. I base this belief upon the fact that I have found the native asphalts, the native asphaltites, and the naturally occurring asphaltic pyrobitumens to be somewhat superior to the pyrogenous asphalts, obtained by heat treatment of petroleum and pyrobitumens. It is believed that the application of heat causes a loss in the volatile constituents and a corresponding increase in the fixed carbon. I have found that the cation exchange capacity of my reagents is in inverse ratio to the fixed carbon content thereof. Accordingly, it is one of the purposes of my invention to avoid excessive heat treatment of the asphaltic materials employed in order to maintain a low fixed carbon content therein.

In place of sulfuric acid, I have found that suitable water purification materials may be prepared by treating asphaltic materials with other sulfonation reagents, following the procedure above described. For example, a mixture of sulfuric acid and halo-sulfonic acid, a mixture of chloro-sulfonic acid and sulfuric acid, chloro-sulfonic acid alone, or sulfuryl chloride may be employed as the sulfating reagent.

In the application of the process to the treatment of liquids, either of two methods may be employed: one, the liquid to be treated may be passed through a filter charged with sulfated asphaltic materials; or, two, the powdered sulfated asphaltic material may be added to the liquid with agitation in advance of a conventional coagulation step.

For the exchange of cations, the treatment of potable waters, and the removal of tastes and odors from liquids, the former method is preferred. In such cases a period of contact from approximately 5 to 10 minutes will be found sufficient. For the treatment of industrial wastes, particularly the removal of dyes, etc., the latter method is preferred. The use of my preferred materials for sewage purification is best carried out by the second of these methods.

The following illustrative examples indicate the adaptation of sulfated asphaltic materials in processes for the purification of liquids and the exchange of cations.

*Example 1*

An Egyptian variety of natural asphalt was sulfated in accordance with the foregoing procedure. The granular material, after drying at a temperature of about 105° C., was added to a water containing 320.0 parts per million of temporary hardness determined as calcium carbonate. Approximately 4 pounds of the sulfated natural asphaltum was added per thousand gallons of water and the mixture was agitated for a period of approximately 10 minutes. The water was then passed through a filter to remove the reagent. A subsequent determination of the temporary hardness of the filtrate indicated that this had been reduced from 320.0 parts per million to 32.0 parts per million. The extremely high reduction in hardness content is believed attributable to the cation exchange capacity of the sulfated natural asphaltum.

*Example 2*

A sulfated asphaltite, prepared by the sulfating, as above described, of a natural occurring gilsonite (such as that found in Utah), in granular form of about 10 mesh, was placed in a conventional water softening filter. Through this filter was then passed a raw water, similar to that treated in Example 1, containing approximately 320.0 parts per million of temporary hardness. The temporary hardness content of this water after treatment with the sulfated gilsonite, was found to be approximately 40.0 parts per million.

These examples show that the sulfated asphaltic materials possess an extremely high capacity for the removal of temporary hardness from water.

Example 3

A residual asphalt, produced by the steam distillation of an asphaltic petroleum, was sulfated by the procedure hereinbefore described and was then added to a water containing 320.0 parts per million of temporary hardness in quantities of approximately 5 pounds per thousand gallons of water with agitation for a period of approximately 15 minutes. After filtration to remove the reagent, the temporary hardness content of the filtrate was determined and found to be 262.5 parts per million. It was thus seen that a pyrogenous asphalt, when sulfated, possessed some cation exchange properties.

Example 4

A rock asphalt, i. e., a native asphalt associated with mineral matter such as sand, sandstone, limestone, etc., which had been refined by a distillation process, was sulfated in accordance with the foregoing procedure. After drying at 105° C., the granular sulfated refined asphalt was added to a water containing 320.0 parts per million of temporary hardness. After agitation and filtration, the filtrate was tested and found to contain approximately 260.0 parts per million of temporary hardness.

The results of the above example indicate that the naturally occurring asphaltic materials when sulfated have a greater base exchange capacity than do those asphaltic materials which have been heat treated. However, because of the availability of the latter as by-products from a number of commercial operations, it is believed that their utilization, when sulfated, as cation exchange materials, is commercially practicable.

Example 5

Sulfated gilsonite as used in Example 2 above, was added to a putrescible water containing a quantity of Rhodamine B sufficient to give a noticeable purple-red coloration. After a short period of agitation, the sulfated gilsonite was filtered from the solution. The effluent from this treatment was found to be entirely free from color and, in addition, possessed no tastes or odors. The B. O. D. of this water was found to be materially reduced by such a treatment.

Example 6

An unused portion of the same putrescible colored liquid utilized in Example 5 was treated with a sulfated residual asphalt originally produced by the steam distillation of an asphaltic petroleum. After agitation and filtration of this liquid, the effluent was found to be entirely free from color, taste and odor, and to have a materially reduced B. O. D.

The sulfated asphaltic materials employed in the above described liquid purification processes may be regenerated by washing with a solution of hydrochloric acid or inorganic chlorides. Regeneration with a 5% solution of hydrochloric acid replaces an hydrogen ion in the exchange position in the reagent. Regeneration with a sodium chloride solution of approximately 5 to 10% concentration replaces a sodium ion in the exchange position of the reagent.

When the sulfated asphaltic material has been thus regenerated, it is found to possess the same capacity for removal of temporary hardness and organic solids in true solution as did the originally produced sulfated asphaltic material.

This application is a division of my copending application, Serial No. 206,281, filed May 5, 1938, now Letters Patent No. 2,208,171, issued July 18, 1940.

It is to be expressly understood that the foregoing description and examples are illustrative only and are not to be considered as limiting this invention beyond the scope of the subjoined claim.

Having thus described my invention, what I claim is:

A process for the preparation of a water-insoluble reagent for use in the treatment of potable and polluted liquids to remove tastes, odors and colors therefrom which comprises granulating asphaltic material, selected from the group consisting of natural asphalt, asphaltite, and asphaltic pyrobitumen, to a particle size ranging from 10 to 50-mesh, slowly adding the powdered asphaltic material to a substantial excess of concentrated sulfuric acid with constant agitation, controlling the temperature of the reaction to prevent a temperature rise in substantial excess of 10°–15° C., and washing and drying the reaction product at a temperature of about 105° C.

OLIVER M. URBAIN.